(12) United States Patent
Cai et al.

(10) Patent No.: US 8,935,407 B2
(45) Date of Patent: Jan. 13, 2015

(54) PROVIDING SUPPLEMENTAL CONTENT TO AN IMS USER DURING REGISTRATION

(75) Inventors: Yigang Cai, Naperville, IL (US); Shiyan Hua, Lisle, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 2357 days.

(21) Appl. No.: 11/756,335

(22) Filed: May 31, 2007

(65) Prior Publication Data
US 2008/0299971 A1    Dec. 4, 2008

(51) Int. Cl.
*G06F 15/16* (2006.01)
*H04L 29/06* (2006.01)

(52) U.S. Cl.
CPC ............ *H04L 65/1016* (2013.01); *H04L 65/40* (2013.01); *H04L 65/1073* (2013.01)
USPC ............................. 709/227; 709/228; 709/229

(58) Field of Classification Search
USPC ............ 709/203, 206, 227; 379/114.13, 67.1; 705/14
See application file for complete search history.

(56) References Cited

U.S. PATENT DOCUMENTS

2008/0126475 A1* 5/2008 Morris .......................... 709/203
2010/0128666 A1* 5/2010 Masson et al. ................ 370/328

* cited by examiner

*Primary Examiner* — Djenane Bayard
(74) *Attorney, Agent, or Firm* — Duft Bornsen & Fettig, LLP

(57) ABSTRACT

IMS networks and methods are disclosed for providing supplemental content to a user of a communication device during registration. When a communication device attempts to register with an IMS network, the IMS network receives a register request message from the communication device, and processes the register request message to register the communication device. The IMS network also identifies supplemental content to provide to the communication device, such as account information, weather content, news, location information, advertisements, etc. The IMS network generates a register response message, and embeds or otherwise includes the supplemental content in the register response message. The IMS network then transmits the register response message to the communication device. Responsive to receiving the register response message, the communication device identifies the supplemental content in the register response message, and provides the supplemental content to the user.

20 Claims, 7 Drawing Sheets

PROVIDING SUPPLEMENTAL CONTENT TO AN IMS USER DURING REGISTRATION

BACKGROUND OF THE INVENTION

1. Field of the Invention

The invention is related to the field of communication networks and, in particular, to IMS networks that provide supplemental content, such as account information, weather, news, or advertisements, to an IMS user when the communication device of the user registers with the IMS network.

2. Statement of the Problem

One type of communication network gaining popularity is an IP Multimedia Subsystem (IMS) network. As set forth in the $3^{rd}$ Generation Partnership Project (3GPP), IMS provides a common core network having access-agnostic network architecture for converged networks. The access network between a communication device and the IMS network may be a cellular network, a WLAN (e.g., a WiFi or a WiMAX network), an Ethernet network, or another type of access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

Before a communication device receives service from the IMS network, the communication device attempts to register with the IMS network. To register according to 3GPP standards, the communication device transmits a register request message, such as a SIP REGISTER message, to a Serving-Call Session Control Function (S-CSCF) in the IMS network. Responsive to the register request message, the S-CSCF generates an authentication request message, such as a Diameter Multimedia Authentication Request (MAR) message, and transmits the authentication request message to a Home Subscriber Server (HSS). The HSS then authenticates the communication device, such as through the AKA authentication method. If the communication device is authenticated, then the S-CSCF generates a subscriber profile request message, such as a Diameter Server Assignment Request (SAR) message, and transmits the subscriber profile request message to the HSS. Responsive to the subscriber profile request message, the HSS identifies the subscriber profile for the user of the communication device. The HSS then transmits a response message, such as a Diameter Server Assignment Answer (SAA) message, to the S-CSCF that includes the subscriber profile for the user of the communication device. The S-CSCF then transmits a register response message, such as a SIP 200 OK message, that includes information that the communication device may use to communicate with the IMS network. For instance, the register response message may include a security key or encryption key used for communication. The register response message may include other information such as a time and date which the communication device may use to synchronize a locally stored time and date, signal strength information if the communication device is mobile, etc. At this point, the communication device is registered with the IMS network and is ready for communication.

After registration is finished, the communication device may display certain content to the user. For instance, a typical communication device may display a name or logo for the service provider, a time and date, signal strength, battery power, etc. If the user wants to view supplemental content, such as a weather report, news, advertisements, etc, then the user has to manually execute a data application on the communication device to request the supplemental content from the IMS network. One such data application is a web-based application that is adapted to access an application server in the IMS network and request content from the application server. One problem with retrieving supplemental content in this manner is that the user has to go through the hassle of manually retrieving the supplemental content. Another problem is that the user may have to subscribe to a special content service at an added cost in order to access the supplemental content. Further, the process of having the communication device transmit a request for supplemental content to the IMS network and having the IMS network transmit the supplemental content to the communication device increases traffic in the IMS network. It may be desirable in IMS networks to provide alternative methods of providing supplemental content to the user of a communication device.

SUMMARY OF THE SOLUTION

Embodiments of the invention solve the above and other related problems by providing supplemental content to a user of a communication device during the registration process. When the communication device transmits a register request message to an IMS network as provided herein, the IMS network identifies supplemental content to provide to the user, and embeds the supplemental content in a subsequent registration response message that is transmitted to the communication device. The communication device may then display or otherwise provide the supplemental content to the user.

For instance, the IMS network may embed account information in the registration response message, and the communication device may display the account information to the user upon power up of the device. For a prepaid user, the account information may include a balance remaining in the account and an expiration date. For a postpaid user, the account information may include the number of minutes used during the present month. The IMS network may alternatively or additionally embed other information in the registration response message, such as a weather report, news, location information, advertisements, etc. Because the supplemental content is embedded in the registration response message, the user of communication device does not have to manually retrieve the supplemental content or subscribe to a special content service to retrieve the supplemental content. The supplemental content is automatically provided to the communication device in the registration response message. Further, automatically providing the supplemental content in the registration response message results in less traffic in the IMS network as compared to the process of requesting the content through a data application in the communication device, and having the IMS network transmit the content to the communication device responsive to the request.

In one embodiment, a communication device of a user attempts to register with an IMS network. The IMS network receives a register request message from the communication device, and processes the register request message to register the communication device with the IMS network. Responsive to registering the communication device, the IMS network also identifies supplemental content to provide to the communication device, such as account information, weather content, news content, location information, advertisements, etc. The IMS network generates a register response message, and embeds or otherwise includes the supplemental content in the register response message. The IMS network then transmits the register response message to the communication device.

Responsive to receiving the register response message, the communication device processes the register response message to identify the supplemental content included in the register response message. The communication device then provides (i.e., displays) the supplemental content to the user of the communication device. The supplemental content is automatically provided to the user upon registration, so the user does not have to manually locate and retrieve the supplemental content.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
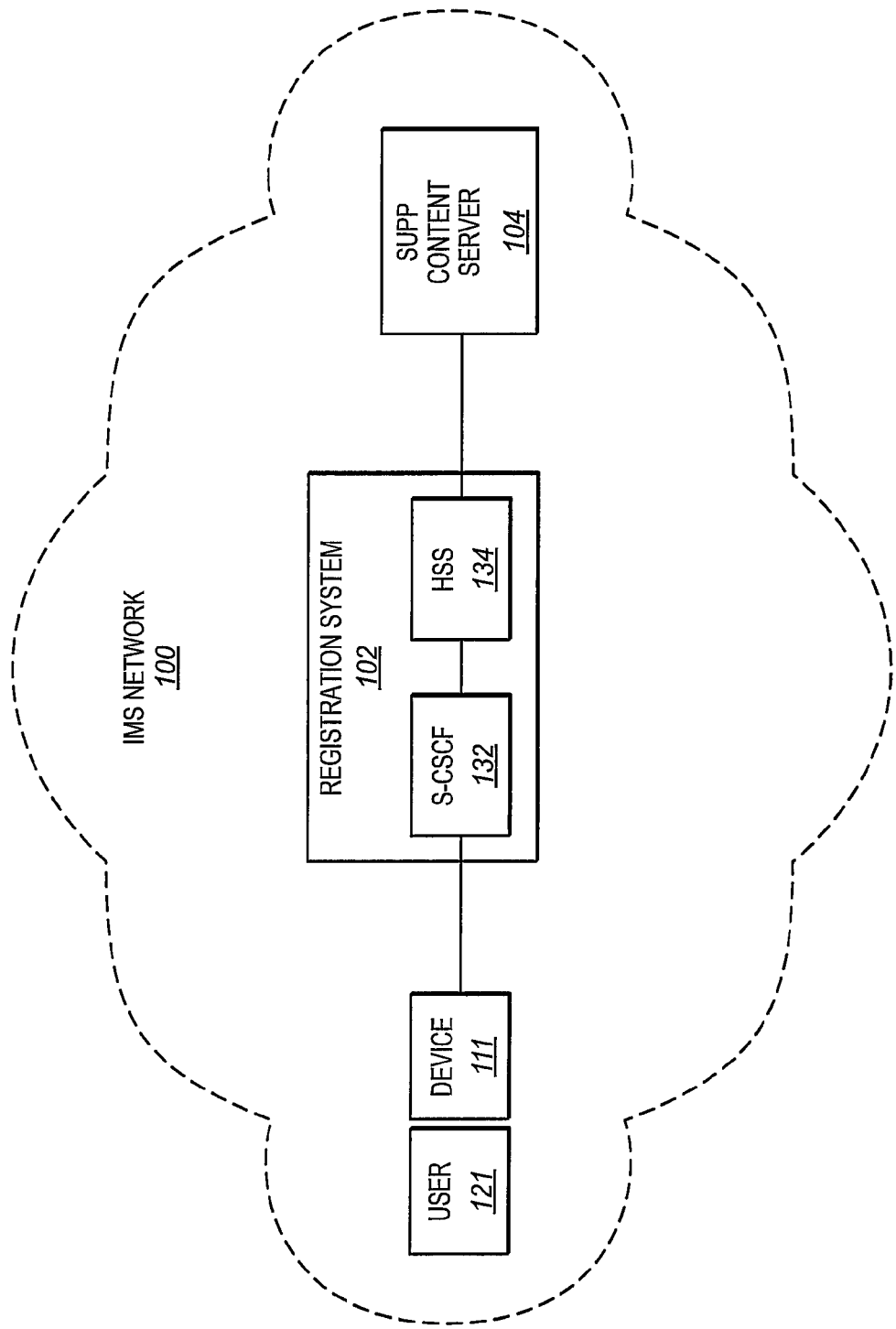
FIG. 1 illustrates an IMS network in an exemplary embodiment of the invention.

FIG. 1 illustrates an IMS network 100 in an exemplary embodiment of the invention. IMS network 100 includes a registration system 102 and a supplemental content server 104. Registration system 102 comprises any server(s), function(s), or other system adapted to register a communication device with IMS network 100 and provide supplemental content to the communication device. Registration system 102 may be implemented in a Serving-Call Session Control Function (S-CSCF) 132, a Home Subscriber Server (HSS) 134, or a combination of the two as illustrated in FIG. 1. Registration system 102 may alternatively be implemented in other nodes in IMS network 100 that are not illustrated in FIG. 1.

Supplemental content server 104 comprises any server(s), function(s), or other system adapted to store supplemental content. One example of supplemental content server 104 comprises a billing system adapted to store information on an account for user 121, such as a prepaid account or a postpaid account. Another example of supplemental content server 104 comprises an Application Server (AS) adapted to store information on weather, news, advertisements, etc. Supplemental content comprises any data, information, or other content that is automatically provided to a user of a communication device upon registration, and that is associated with the user or specifically requested from the IMS network by the user. Examples of supplemental content include account information for an account of the user in the IMS network, weather content, news content (i.e., local news, national news, international news, sports, etc), location information, advertisements, etc. Supplemental content as described herein is not traditionally provided to a communication device by an IMS network during registration. As stated in the Background, an IMS network may traditionally provide time and date information to a communication device during registration so that the communication device may synchronize its internal time and date. The communication device may then display the time and date to the user, but the displayed time and date represents the internal time and date of the communication device. The time and date is not associated with the user or specifically requested from the IMS network by the user. Also, mobile devices may receive signal strength information from the IMS network during registration (although the signal strength information may be determined by the mobile device). The signal strength information represents the strength of the signal being received by the communication device, and is not associated with the user of the communication device or specifically requested by the user as this information is provided to every mobile device regardless of the user. Thus, the supplemental content as described herein is not presently provided to users of communication devices.

IMS network 100 also includes a communication device 111 being operated by a user 121. Device 111 may be a SIP-enabled device or another type of device adapted to communicate with IMS network 100. Device 111 may comprise a wireline device, or may comprise a wireless device adapted to communicate with IMS network 100 through the appropriate wireless access network. The wireless access network may comprise a WiFi network, a WiMAX network, or another type of WLAN using protocols such as 802.11b, 802.11g, or Bluetooth. The wireless access network may alternatively comprise a cellular network, such as a CDMA or a GSM network.

Figure 2:
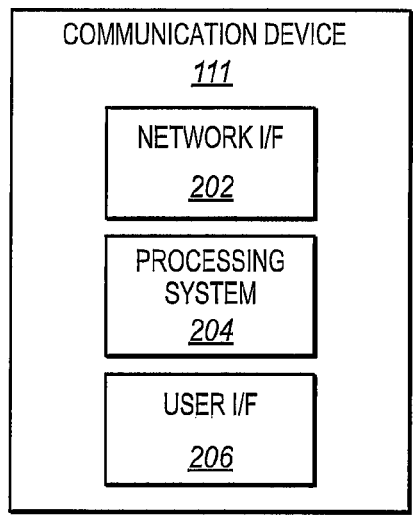
FIG. 2 illustrates a communication device in an exemplary embodiment of the invention.

FIG. 2 illustrates device 111 in an exemplary embodiment of the invention. Device 111 comprises a network interface 202, a processing system 204, and a user interface 206. Network interface 202 comprises any components or systems adapted to communicate with IMS network 100 and/or an access network of IMS network 100. Network interface 202 may comprise a wireline interface or a wireless interface. Processing system 204 comprises a processor or group of inter-operational processors adapted to operate according to a set of instructions. The instructions may be stored on a removable card or chip, such as a SIM card. User interface 206 comprises any components or systems adapted to receive input from a user and/or convey content to the user, such as a keypad, a display, a pointing device, etc.

In FIG. 1, assume that device 111 powers up. Device 111 is programmed to register with IMS network 100 in order to receive communication service. According to this embodiment, device 111 is further adapted to receive supplemental content and provide the supplemental content to user 121 during the registration process.

Figure 3:
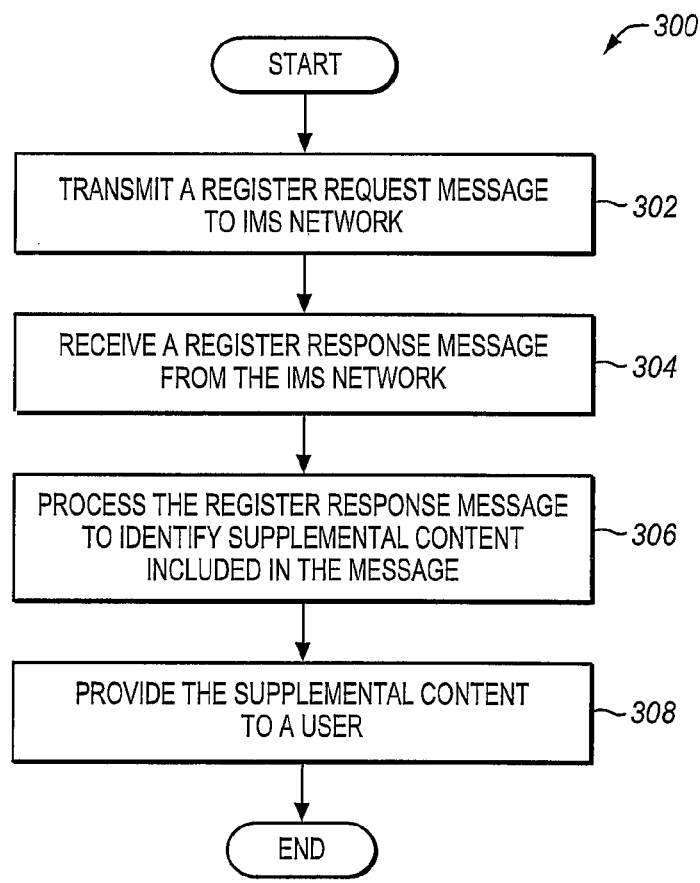
FIG. 3 is a flow chart illustrating a method of operating a communication device during registration with an IMS network to provide supplemental content to a user in an exemplary embodiment of the invention.

FIG. 3 is a flow chart illustrating a method 300 of operating device 111 during registration with IMS network 100 to provide supplemental content to user 121 in an exemplary embodiment of the invention. The steps of method 300 will be described with reference to IMS network 100 in FIG. 1 and device 111 in FIG. 2. The steps of the flow chart in FIG. 3 are not all inclusive and may include other steps not shown.

In step 302 of method 300, processing system 204 transmits a register request message to IMS network 100 through network interface 202. The register request message may comprise a SIP REGISTER message or a message of another protocol. IMS network 100 operates as follows responsive to the receiving the register request message.

Figure 4:
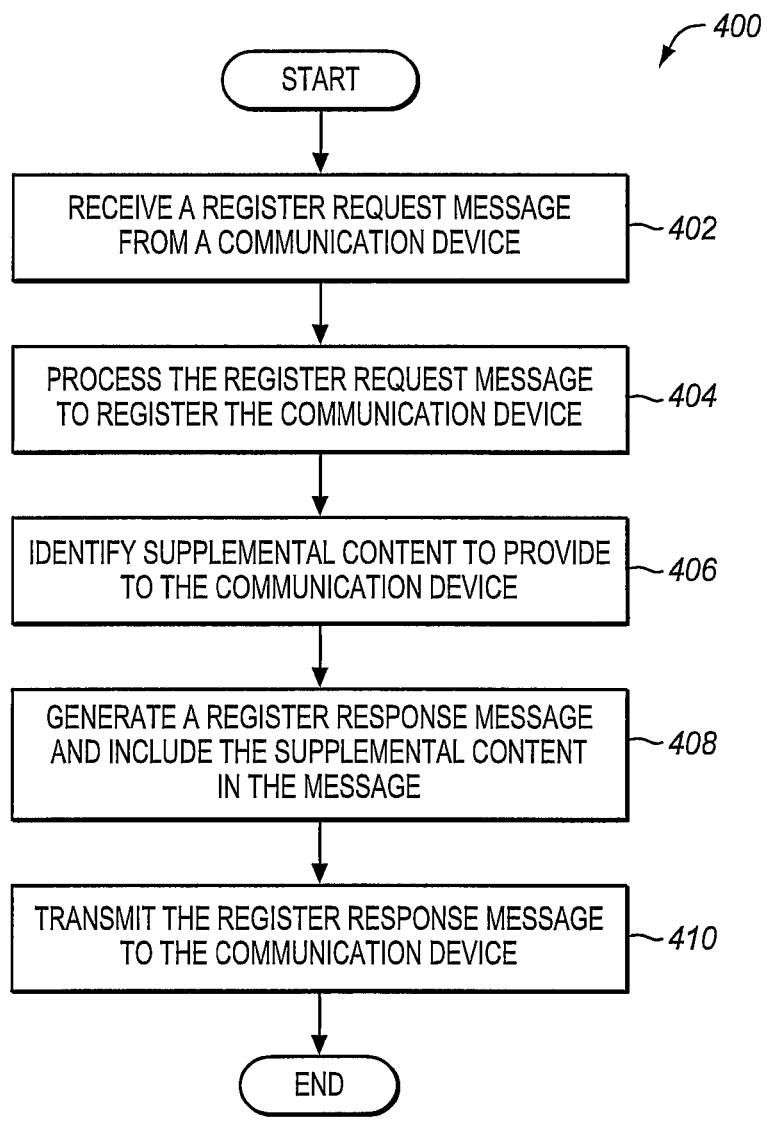
FIG. 4 is a flow chart illustrating a method of operating an IMS network to provide supplemental content to a user of a communication device during registration in an exemplary embodiment of the invention.

FIG. 4 is a flow chart illustrating a method 400 of operating IMS network 100 to provide supplemental content to user 121 of device 111 during registration in an exemplary embodiment of the invention. The steps of method 400 will be described with reference to IMS network 100 in FIG. 1. The steps of the flow chart in FIG. 4 are not all inclusive and may include other steps not shown.

In step 402 of method 400, registration system 102 receives the register request message from device 111. The register request message may include content criteria defining the type of supplemental content requested by user 121. For instance, user 121 may define that he/she would like to receive supplemental content related to the weather. In another instance, user 121 may define that device 111 can receive content in a certain format. In step 404, registration system 102 processes the register request message to register device 111 with IMS network 100. The registering of device 111 may include the authentication of device 111 through the AKA authentication method or another method. Registering device 111 may further include retrieving a subscriber profile for user 121 to identify services subscribed to by user 121.

Responsive to registering device 111, registration system 102 identifies supplemental content in supplemental content server 104 to provide to device 111 in step 406. In some embodiments, registration system 102 may also identify supplemental content that is stored locally in registration system 102, or in other nodes. Registration system 102 may identify the supplemental content in many desired ways. In one example, the subscriber profile for user 121 may indicate particular content that user 121 desires to receive, and may also indicate where to locate such content. For instance, if user 121 desires to receive weather content, then the subscriber profile for user 121 may indicate as such and provide a link to a weather server (e.g., server 104). In another example, registration system 102 may identify that user 121 is a prepaid user and consequently may identify account information for user 121, such as by querying a billing system (e.g., server 104). In another example, registration system 102 may identify the supplemental content based on content criteria that is provided by user 121 in the register request message. The content criteria may indicate a topic desired by user 121, such as sports. The content criteria may indicate display capabilities of device 111, such as size or compatible formats that are supported by user interface 206 of device 111 (see FIG. 2).

In step 408, registration system 102 generates a register response message and embeds or otherwise includes the supplemental content in the register response message. One example of a register response message comprises a SIP 200 OK message with the supplemental content embedded within. In step 410, registration system 102 transmits the register response message to device 111.

In FIG. 3, processing system 204 receives the register response message from registration system 102 through network interface 202 in step 304. In step 306, processing system 204 processes the register response message to identify the supplemental content included in the register response message. In step 308, processing system 204 provides the supplemental content to user 121 through user interface 206. For instance, processing system 204 may display the supplemental content to user 121, may play the supplemental content as audio, or may provide the content in other ways. Processing system 204 may also control the duration of time the supplemental content is displayed, and may provide some kind of alerting (e.g., beeps or tones) when the supplemental content is first displayed and/or when the supplemental content is deleted.

Processing system 204 may filter the supplemental content before providing the content to user 121. Processing system 204 may store filter criteria that is defined by user 121, a network operator, or the service provider that is used to filter the supplemental content. Based on the filter criteria, processing system 204 may determine whether to provide the supplemental content in full, to provide a portion of the supplemental content, or to not provide the supplemental content at all. In one example, if user 121 requests to receive weather content from IMS network 100 during registration, then processing system 204 may filter the weather content depending on the location of user 121. If user 121 is located in his/her home network, then processing system 204 may determine not to provide the weather content to user 121. If user 121 is located in a visited network, then processing system 204 may determine to provide the weather content to user 121.

The registration process described above occurs when device 111 is powered on or first contacts IMS network 100. After device 111 is first registered, it periodically re-registers with IMS network 100, such as every thirty seconds, every minute, responsive to moving, etc. During re-registration, device 111 transmits a re-register request message to IMS network 100. Responsive to a re-register request message, IMS network 100 operates as follows.

Figure 5:
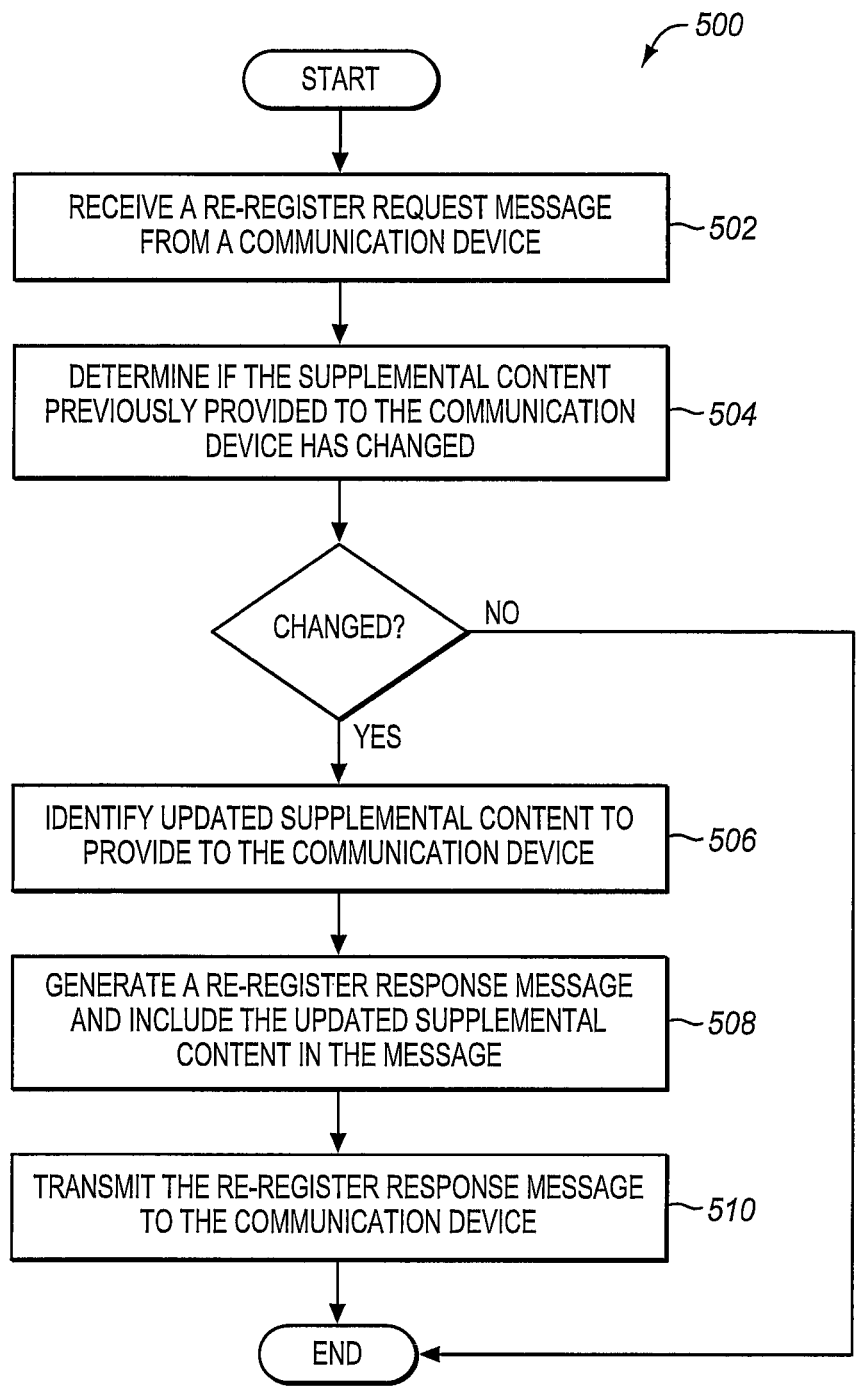
FIG. 5 is a flow chart illustrating a method of operating an IMS network to provide supplemental content to a user of a communication device during re-registration in an exemplary embodiment of the invention.

FIG. 5 is a flow chart illustrating a method 500 of operating IMS network 100 to provide supplemental content to user 121 of device 111 during re-registration in an exemplary embodiment of the invention. The steps of method 500 will be described with reference to IMS network 100 in FIG. 1. The steps of the flow chart in FIG. 5 are not all inclusive and may include other steps not shown.

In step 502 of method 500, registration system 102 receives the re-register request message from device 111. In step 504, registration system 102 determines if the supplemental content previously provided to device 111 has changed. For instance, if the supplemental content previously provided to device 111 is information on a baseball game, then the score of the game, the inning of the game, etc, may have changed since the supplemental content was last provided to device 111. Or, if the supplemental content previously provided to device 111 is account information, then the account balance may have changed since the supplemental content was last provided to device 111.

If the supplemental content previously provided has changed, then registration system 102 identifies updated supplemental content in supplemental content server 104 to provide to device 111. Again, registration system 102 may also identify the updated supplemental content that is stored locally in registration system 102, or in other nodes. In step 508, registration system 102 generates a re-register response message and embeds or otherwise includes the updated supplemental content in the re-register response message. In step 510, registration system 102 transmits the re-register response message to device 111.

EXAMPLE

Figure 6:
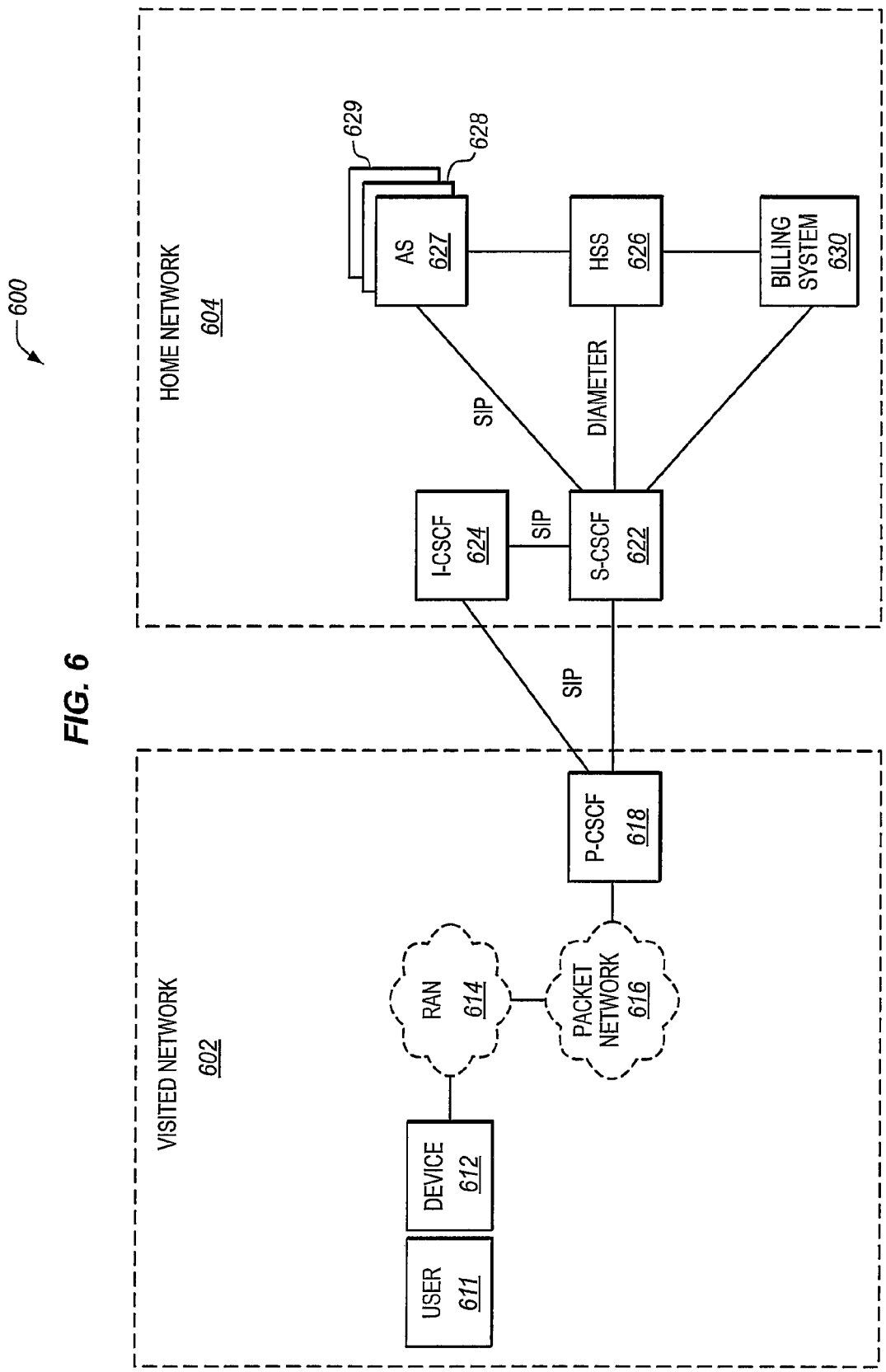
FIG. 6 illustrates an IMS network in another exemplary embodiment of the invention.
Figure 7:
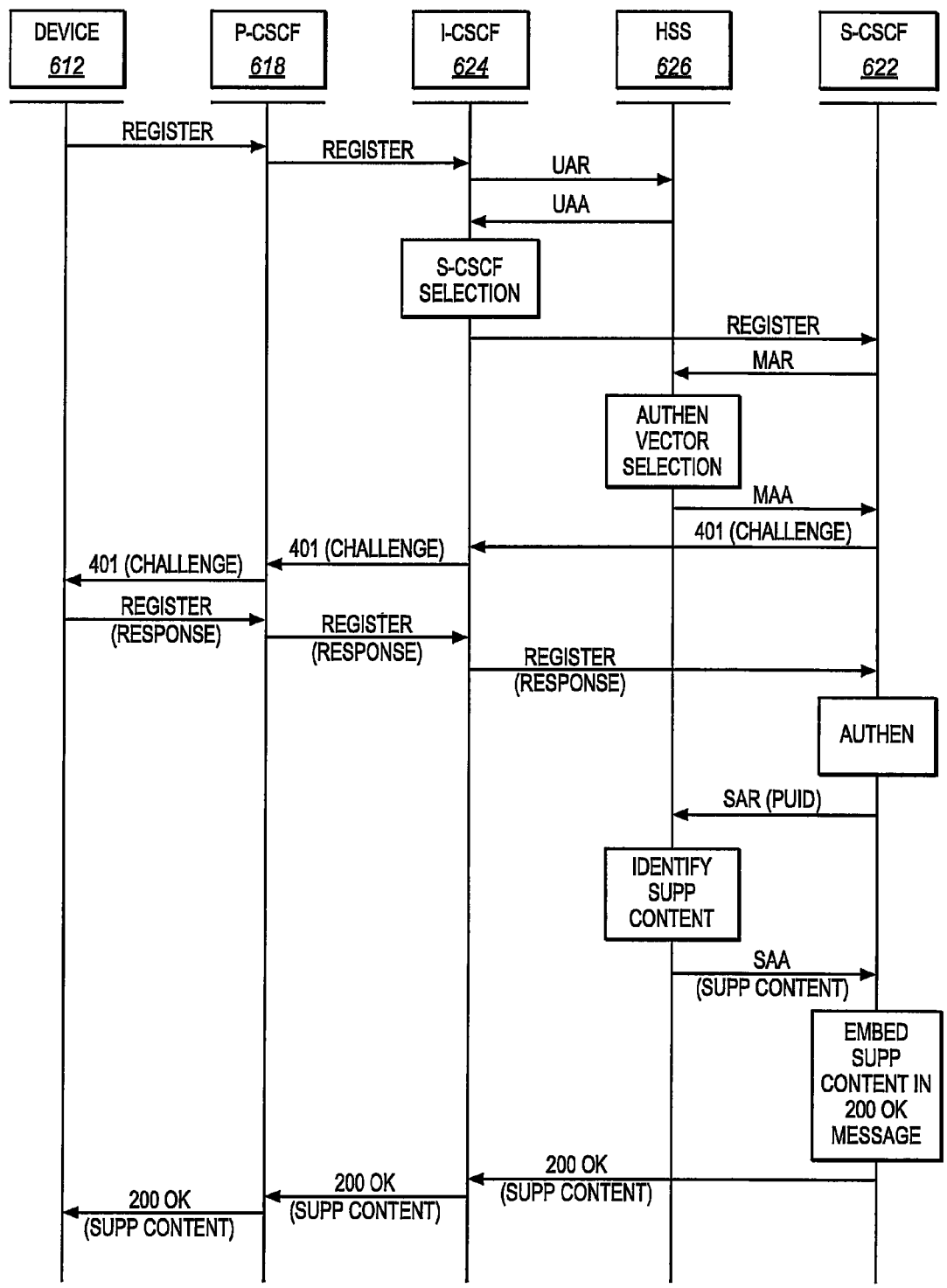
FIG. 7 is a message diagram illustrating messaging used to provide supplemental content to a mobile device during registration with an IMS network in an exemplary embodiment of the invention.
Figure 8:
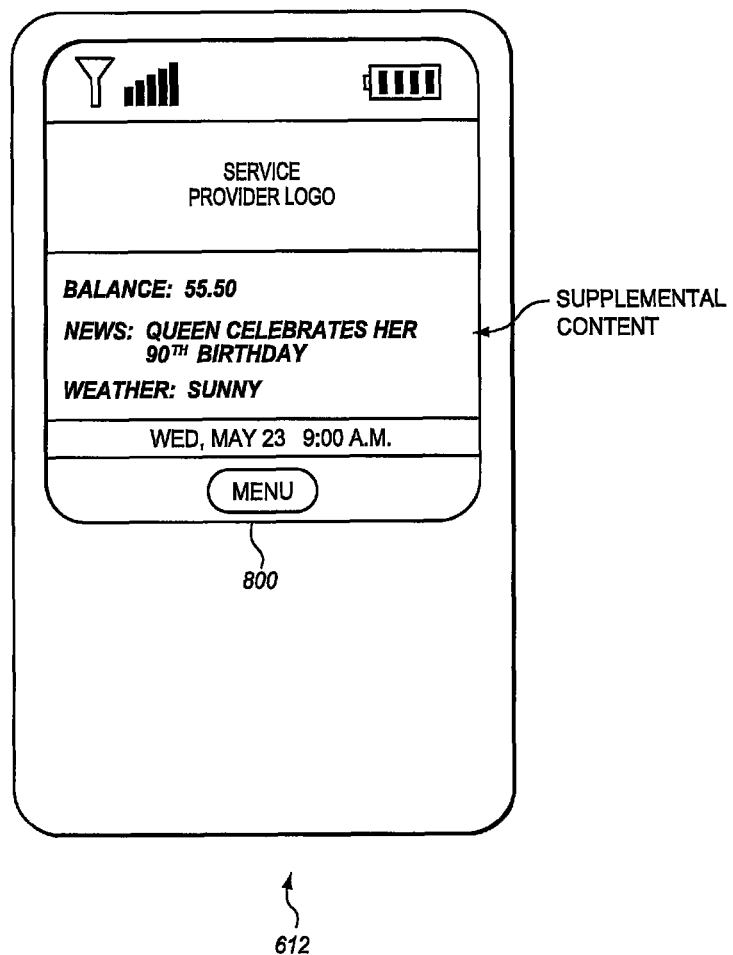
FIG. 8 illustrates an exemplary screen of a mobile device displaying supplemental content in an exemplary embodiment of the invention.

FIGS. 6-8 illustrate an example of operating an IMS network to provide supplemental content to a user of a communication device. FIG. 6 illustrates an IMS network 600 in an exemplary embodiment of the invention. IMS network 600 includes a visited network 602 and a home network 604. Visited network 602 includes a mobile device 612, a Radio Access Network (RAN) 614, a packet network 616, and a Proxy-CSCF (P-CSCF) 618. Mobile device 612 is being operated by user 611. Home network 604 includes an S-CSCF 622, an Interrogate-CSCF (I-CSCF) 624, an HSS 626, a plurality of application servers 627-629, and a billing system 630. In this embodiment, S-CSCF 622 and HSS 626 represent a registration system as shown in FIG. 1. IMS network 600 may include other nodes that are not illustrated in FIG. 6 for the sake of brevity.

In FIG. 6, assume that mobile device 612 powers on or moves into a service area of RAN 614. Mobile device 612 is programmed to register with IMS network 600 in order to receive communication service. In this example, IMS network 600 is adapted to provide supplemental content to mobile device 612 during registration.

FIG. 7 is a message diagram illustrating messaging used to provide supplemental content to mobile device 612 during registration with IMS network 600 in an exemplary embodiment of the invention. The message diagram illustrates SIP and Diameter messaging used within IMS network 600. To begin, device 612 generates a SIP REGISTER message and transmits the REGISTER message to P-CSCF 618 through RAN 614 and packet network 616. P-CSCF 618 then forwards the REGISTER message to I-CSCF 624. The REGISTER message may include content criteria indicating the type of content desired by user 611.

The following is an example of a REGISTER message that is transmitted from device 612 to P-CSCF 615. The new data in the SIP REGISTER message is indicated in bold. The new data indicates that device 612 is able to display supplemental content, that it supports all media types, and that the categories of interest for user 611 are content relating to a prepaid balance, news, and weather.

```
REGISTER sip:registrar.home1.net SIP/2.0
Via:SIP/2.0/UDP[5555::aaa:bbb:ccc:ddd];comp=sigcomp;
branch=z9hG4bKnashds7
Max-Forwards: 70
P-Access-Network-Info: wlan-mac-addr=00BA5550EEFF
From: <sip:user1_public1@home1.net>;tag=4fa3
To: <sip:user1_public1@home1.net>
Contact: <sip:[5555::aaa:bbb:ccc:ddd];comp=sigcomp>;
expires=600000
Call-ID: apb03a0s09dkjdfglkj49111
Authorization: Digest username="user1_private@home1.net",
realm="registrar.home1.net", nonce="", uri="sip:registrar.home1.net",
response=""
Security-Client: ipsec-3gpp; alg=hmac-sha-1-96; spi-c=23456789;
spi-s=12345678; port-c=2468; port-s=1357
Require: sec-agree
Proxy-Require: sec-agree
CSeq: 1 REGISTER
Supported: path
UE Display Ability: Yes; MediaType=All;
category=prepaid_balance, news, weather
Content-Length: 0
```

Responsive to receiving the REGISTER message, I-CSCF 624 generates a Diameter User Authentication Request (UAR) message and transmits the UAR message to HSS 626. HSS 626 then responds to the UAR message with a Diameter User Authentication Answer (UAA) message. Responsive to receiving the UAA message, I-CSCF 624 selects the S-CSCF 622 to serve mobile device 612. I-CSCF 624 then transmits the SIP REGISTER message to S-CSCF 622. Responsive to receiving the REGISTER message, S-CSCF 622 generates a Diameter Multimedia Authentication Request (MAR) message to continue the process of registering device 612. S-CSCF 622 includes a private identifier (PRID) and/or a public identifier (PUID) in the MAR message, and transmits the MAR message to HSS 626.

HSS 626 processes the PRID in the MAR message to generate an AKA vector based on the AKA authentication method. HSS 626 then generates a Diameter Multimedia Authentication Answer (MAA) message in response to the MAR message, and includes the AKA vector in the MAA message such as in the SIP-Authenticate AVP of the MAA. Responsive to receiving the MAA message, S-CSCF 622 transmits a SIP 401 (Challenge) message to mobile device 612 (through P-CSCF 618, packet network 616, and RAN 614) to challenge mobile device 612 for an authentication check. Mobile device 612 receives the 401 message, and calculates the authentication response. Mobile device 612 then generates another SIP REGISTER message and transmits the REGISTER message back to S-CSCF 622. Responsive to receiving the REGISTER message, S-CSCF 622 processes the authentication response in relation to the authentication vector to determine whether mobile device 612 is authenticated. If mobile device 612 is authenticated, then S-CSCF 622 transmits a Diameter Server Assignment Request (SAR) message to HSS 626 to retrieve the subscriber profile for user 611 of mobile device 612. Responsive to the SAR message, HSS 626 identifies the subscriber profile for user 611 based on the PUID for user 611.

HSS 626 also identifies supplemental content to provide to user 611. In one example, assume that user 611 desires to receive weather content, which may be indicated in the subscriber profile of user 611. When HSS 626 determines that user 611 has requested to receive weather content, HSS 626 may identify location information for user 611. The location information may be obtained through GPS information provided by mobile device 612, may be obtained based on an access point in RAN 614 through which mobile device 612 is communicating, or through another means. HSS 626 may then identify one of the application servers 627-629 that stores weather content for the location of user 611, and retrieve the weather content.

In another example, assume that user 611 desires to receive information on baseball games. When HSS 626 determines that user 611 has requested to receive information on baseball games, HSS 626 may identify one of the application servers 627-629 that stores the appropriate sporting content, and retrieve the information on the baseball games.

In another example, assume that user 611 has a prepaid account with IMS network 600, and user 611 desires to receive account information upon registration. When HSS 626 determines that user 611 has requested to receive account information, HSS 626 may contact billing system 630 to retrieve account information for user 611. The account information may include a present balance of the account and an expiration date for this balance.

After identifying the supplemental content, HSS 626 generates a Diameter Server Assignment Answer (SAA) message, and embeds the supplemental content in the SAA message. The SAA message also includes the subscriber profile for user 611. HSS 626 then transmits the SAA message to S-CSCF 622.

Responsive to receiving the SAA message, S-CSCF 622 generates a SIP 200 OK message, and embeds the supplemental content in the 200 OK message. The following is an example of a 200 OK message that is transmitted from S-CSCF 622 to device 612. The new data in the SIP 200 OK message is indicated in bold. The supplemental content embedded in the 200 OK message indicates that the prepaid balance is "55.50", that the news is "Queen celebrating her 90$^{th}$ birthday", and that the weather is "sunny".

```
SIP/2.0 200 OK
   Via: SIP/2.0/UDP icscf1_p.home1.net;branch=z9hG4bK351g45.1,
SIP/2.0/UDP pcscf1.visited1.net;branch=z9hG4bK240f34.1, SIP/2.0/UDP
[5555::aaa:bbb:ccc:ddd]:1357;comp=sigcomp;branch=z9hG4bKnashds7
   Path: <sip:term@pcscf1.visited1.net;lr>
   Service-Route: <sip:orig@scscf1.home1.net;lr>
   From:
   To:
   Call-ID:
   Contact: <sip:[5555::aaa:bbb:ccc:ddd]:1357;comp=sigcomp>;
   expires=600000
   CSeq:
   Date: Wed, 11 July 2001 08:49:37 GMT
   P-Associated-URI: <sip:user1_public2@home1.net>,
<sip:user1_public3@home1.net>,
<sip:+1-212-555-1111@home1.net;user=phone>
      <?xml version="1.0" encoding="UTF 8">
      <UEDisplayInfo>
       <command MediaType="All", NumberOfInfo="3",
       Display="optional"
         <name1>prepaidBalance</name1>
         <value1>55.50</value1>
         <name2>news</name2>
         <value2>Queen celebrating her 90th birthday</value2>
         <name3>localWeather</name3>
         <value3>Sunny</value3>
      </UEDisplayInfo>
   Content-Length:
```

S-CSCF 622 transmits the 200 OK message to mobile device 612 (through P-CSCF 618, packet network 616, and RAN 614). Mobile device 612 then processes the 200 OK message to identify the supplemental content included in the message, and displays the supplemental content to user 611.

FIG. 8 illustrates an exemplary screen 800 of mobile device 612 displaying supplemental content in an exemplary embodiment of the invention. As with traditional mobile devices, screen 800 displays a service provider logo, a battery power indicator, a signal strength indicator, a date and time, and operating menus. Screen 800 additionally displays supplemental content as provided by IMS network 600 during registration. In this embodiment, the supplemental content comprises prepaid account information for user 611. The account information shows that user 611 has an account balance of 55.50 units (may be indicated as a currency). The supplemental content also comprises news content that the queen is celebrating her 90$^{th}$ birthday. The supplemental content also comprises weather content indicating that the weather forecast is "sunny". This supplemental content was embedded in the SIP 200 OK message transmitted from S-CSCF 622.

As is illustrated in this example, IMS network 600 effectively transmits supplemental content to mobile device 612 for display to user 611 during the registration process. User 611 does not have to manually request this content, as IMS network 600 automatically provides the content to mobile device 612 when it is turned on. This feature can be valuable to service providers operating IMS networks, and can be convenient to users that desire to automatically receive certain content from the IMS network.

Although specific embodiments were described herein, the scope of the invention is not limited to those specific embodiments. The scope of the invention is defined by the following claims and any equivalents thereof.

We claim:

1. An IMS network adapted to provide supplemental content to a user of a communication device during registration, the IMS network comprising:
   a supplemental content server adapted to store the supplemental content; and
   a registration system adapted to receive a register request message from the communication device of the user, to process the register request message to register the communication device with the IMS network, to identify the supplemental content in the supplemental content server to provide to the communication device responsive to registering the communication device, to generate a register response message and include the supplemental content in the register response message, and to transmit the register response message to the communication device.

2. The IMS network of claim 1 further comprising the communication device that is adapted to receive the register response message from the registration system, to process the register response message to identify the supplemental content included in the register response message, and to provide the supplemental content to the user.

3. The IMS network of claim 1 further comprising the communication device that is adapted to receive the register response message from the registration system, to process the register response message to identify the supplemental content included in the register response message, to filter the supplemental content based on filter criteria, and to provide the filtered supplemental content to the user.

4. The IMS network of claim 1 wherein the registration system is further adapted to receive the register request message that includes content criteria defining the type of supplemental content requested by the user, and to identify the supplemental content in the supplemental content server based on the content criteria.

5. The IMS network of claim 1 wherein the supplemental content comprises IMS network account information for the user.

6. The IMS network of claim 1 wherein the supplemental content comprises at least one of weather content, news content, location information, or an advertisement.

7. The IMS network of claim 1 wherein the registration system is further adapted to receive a re-register request message from the communication device, to determine if the supplemental content previously provided to the communication device has changed, to identify updated supplemental content in the supplemental content server to provide to the communication device responsive to determining that the supplemental content previously provided to the communication device has changed, to generate a re-register response message and including the updated supplemental content in the re-register response message, and to transmit the re-register response message to the communication device.

8. A method of operating an IMS network to provide supplemental content to a user of a communication device during registration, the method comprising:
   receiving a register request message from the communication device of the user;
   processing the register request message to register the communication device with the IMS network;

identifying the supplemental content to provide to the communication device responsive to registering the communication device;
generating a register response message and including the supplemental content in the register response message; and
transmitting the register response message to the communication device.

9. The method of claim 8 further comprising:
receiving the register response message in the communication device;
processing the register response message to identify the supplemental content included in the register response message; and
providing the supplemental content to the user of the communication device.

10. The method of claim 8 further comprising:
receiving the register response message in the communication device;
processing the register response message to identify the supplemental content included in the register response message;
filtering the supplemental content based on filter criteria; and
providing the filtered supplemental content to the user of the communication device.

11. The method of claim 8 wherein:
receiving a register request message from the communication device comprises receiving the register request message that includes content criteria defining the type of supplemental content requested by the user; and
identifying the supplemental content to provide to the communication device comprises identifying the supplemental content based on the content criteria.

12. The method of claim 8 wherein the supplemental content comprises IMS network account information for the user.

13. The method of claim 8 wherein the supplemental content comprises at least one of weather content, news content, location information, or an advertisement.

14. The method of claim 8 further comprising:
receiving a re-register request message from the communication device;
determining if the supplemental content previously provided to the communication device has changed;
identifying updated supplemental content to provide to the communication device responsive to determining that the supplemental content previously provided to the communication device has changed;
generating a re-register response message and including the updated supplemental content in the re-register response message; and
transmitting the re-register response message to the communication device.

15. A method of operating a communication device of an IMS network to receive supplemental content during registration, the method comprising:
transmitting a register request message to the IMS network;
receiving a register response message from the IMS network in response to the register request message, wherein the register response message includes supplemental content that was embedded by the IMS network;
processing the register response message to identify the supplemental content embedded in the register response message; and
providing the supplemental content to a user.

16. The method of claim 15 further comprising:
filtering the supplemental content based on filter criteria; and
providing the filtered supplemental content to the user.

17. The method of claim 15 wherein transmitting a register request message to the IMS network comprises:
transmitting the register request message that includes content criteria defining the type of supplemental content requested by the user.

18. The method of claim 15 wherein the supplemental content comprises IMS network account information for the user.

19. The method of claim 15 wherein the supplemental content comprises at least one of weather content, news content, location information, or an advertisement.

20. The method of claim 15 further comprising:
transmitting a re-register request message to the IMS network;
receiving a re-register response message from the IMS network in response to the re-register request message, wherein the re-register response message includes updated supplemental content that was embedded by the IMS network;
processing the re-register response message to identify the updated supplemental content embedded in the re-register response message; and
providing the updated supplemental content to the user.

* * * * *